(12) United States Patent
Higgins (10) Patent No.: US 9,073,105 B2
(45) Date of Patent: Jul. 7, 2015

(54) COLLAPSIBLE AQUATIC SEDIMENT ENCLOSURE AND PROCESS FOR REMOVAL OF CONTAMINANTS

(71) Applicant: Jonathan Brett Higgins, Amesbury, MA (US)

(72) Inventor: Jonathan Brett Higgins, Amesbury, MA (US)

(73) Assignee: P-Pod Technologies, LLC., Amesbury, MA (US)

( * ) Notice: Subject to any disclaimer, the term of this patent is extended or adjusted under 35 U.S.C. 154(b) by 0 days.

(21) Appl. No.: 13/742,011

(22) Filed: Jan. 15, 2013

(65) Prior Publication Data

US 2015/0023734 A1   Jan. 22, 2015

Related U.S. Application Data

(60) Provisional application No. 61/586,810, filed on Jan. 15, 2012.

(51) Int. Cl.
*B09C 1/00* (2006.01)

(52) U.S. Cl.
CPC ............... *B09C 1/00* (2013.01); *B09C 2101/00* (2013.01)

(58) Field of Classification Search
CPC .............................. B09C 1/00; B09C 2101/00

USPC ........ 405/52, 60, 63–65, 72, 128.2, 203, 205, 405/210; 166/364; 210/923
See application file for complete search history.

(56) References Cited

U.S. PATENT DOCUMENTS

| | | | | |
|---|---|---|---|---|
| 2,383,840 | A * | 8/1945 | Benckert | 222/95 |
| 4,047,390 | A * | 9/1977 | Boyce, II | 405/188 |
| 4,645,379 | A * | 2/1987 | Grimsley et al. | 405/210 |
| 6,592,299 | B1 * | 7/2003 | Becker | 405/210 |
| 8,523,482 | B1 * | 9/2013 | Watson, Sr. | 405/60 |
| 8,534,365 | B2 * | 9/2013 | Dighe | 166/364 |
| 8,678,707 | B1 * | 3/2014 | Powell et al. | 405/60 |

* cited by examiner

*Primary Examiner* — Tara M. Pinnock
(74) *Attorney, Agent, or Firm* — Hamilton, Brook, Smith & Reynolds, P.C.

(57) ABSTRACT

A collapsible aquatic enclosure apparatus is described for use in capturing, isolating and removing contaminants and otherwise easily dispersed aquatic sediments and detritus in water bodies. The collapsible aquatic enclosure can also be used for removal and control of targeted aquatic fauna and flora. Once deployed, the collapsible enclosure creates an isolated volume of water above the target aquatic area. Internal plunger and pipe intake structure within the enclosure provide agitation to remove contaminants, sediments and detritus and targeted fauna and flora residues inside the collapsible apparatus. Methods for using the collapsible aquatic enclosure apparatus are also described.

14 Claims, 6 Drawing Sheets

FIGURE 5 - All Enclosure Layers Removed

COLLAPSIBLE AQUATIC SEDIMENT ENCLOSURE AND PROCESS FOR REMOVAL OF CONTAMINANTS

BACKGROUND

Contaminants in aquatic sediments and detritus can include oil and hazardous materials, toxic metals, and nutrients like phosphorus, nitrates and sulfates. Some of these contaminants readily absorb to suspended organic and inorganic materials or seston in water. Some of the contaminants, particularly the nutrient phosphorus, can be taken up and used by aquatic biota including benthic and pelagic algae, cyanobacteria, and plants. Eventually, the contaminants of interest to this invention are those that settle out of the water column to form a very loose, detritus layer on sediment that can be easily resuspended, dispersed or released in a soluble, solid, or colloidal form back into the water column by physical disturbance, diffusion, microbial and geochemical processes, or the actions of aquatic biota.

For the purpose of this invention algae, cyanobacteria, and invasive, noxious and nuisance densities of aquatic plants or animals are also considered contaminants that can be targeted by this invention for control or removal from water bodies.

Contaminants in sediments and detritus can also concentrate in ecologically sensitive, littoral regions of water bodies that could be adversely impacted by other dredging methods or application of chemicals or clay to treat or bind contaminants. Similarly, contaminants can also be located in shallow water containing invasive, noxious, or nuisance densities of aquatic plants, algae and biota that could be spread further throughout the water body if other dredging methods or treatment with chemicals were used. Shallow water areas are also not conducive to the use of chemicals to treat contaminants or for clay to bind or cover contaminants due to wave action and water turbulence often found in shallow water areas.

SUMMARY OF THE INVENTION

This collapsible enclosure for removal of contaminants in water bodies is a light, ecologically-sensitive structure that can be deployed by a limited number of trained people without the need for barges, cranes or heavy equipment operators. The collapsible enclosure itself is constructed primarily with soft layers of waterproof fabric in order to minimize potential damage to sensitive ecological receptors like shellfish and snails. The contaminant removal processes can allow for either the release of dissociable contaminants or biotic cells containing contaminants from sediments into enclosed water, or the physical removal of contaminated sediments and detritus by raising and lowering the top of the enclosure and plunger to suspend loose sediments and detritus within the enclosure. The dissolved and suspended contaminants within the isolated, interior portion of the enclosure could then be pumped out and brought to shore for either treatment and return of treated water to the water body or offsite reuse or recycling of water and recovered sediments and detritus. While pumping out the contents of the collapsible enclosure, the top of the enclosure can be allowed to collapse. The collapsibility of the enclosure keeps contaminant removal volumes to a minimum without having to add water or air to the enclosure during pumping.

This invention serves as a means to capture and remove contaminants contained in very loose sediments and detritus by enclosing targeted contaminant areas in water bodies. The primary advantages of this invention compared to other contaminant response actions in water bodies is that it both minimizes physical disturbance and dispersion of the almost smoke-like sediment and detrital layer, and it is also primarily a soft apparatus that can limit the amount of potential damage to benthic fauna such as snails and shellfish when compared to other dredging techniques or the use of hard or rigid, containment structures or vessels on the sediment surface. Aquatic fauna could also be selectively removed from targeted contaminant areas and relocated elsewhere in the same water body before deploying the invention enclosures.

Once enclosed, areas of targeted contaminants can be removed either by dissociation of contaminants from the solid to soluble form within the enclosure then removal of the enclosed, and now contaminated water, or by direct physical disturbance and resuspension of contaminated sediments and detritus within the enclosure followed by removal of this now contaminated water volume. Similarly, some biotic cells containing contaminants may rise up within the enclosure during deployment thus facilitating their removal.

Contaminants within the enclosure that are amenable to dissociation from solid to soluble form by microbial and geochemical processes, such as the nutrient phosphorus or the metals arsenic or mercury, can be targeted for removal by allowing naturally-occurring or enhanced biogeochemical processes to occur within the enclosure. Enhancement of biogeochemical processes to help dissociate solid contaminants to soluble forms could include increasing temperature, dissolved oxygen content, carbohydrate or electron acceptor substrate content within the enclosure.

Another advantage of the soft structure invention is that the volume of extracted contaminated water and suspensions removed from the enclosure can be kept to a minimum by allowing the structure to collapse or shrink without having to replace water removed with clean water or air during pumping of the enclosures' contents.

Physical disturbance of very loose sediment and detritus within the enclosure can be brought about by raising and lowering a suspension cable, pump intake piping and plunger attached to the top center of the enclosure either manually or from wave action on a floating buoy attached to the suspension cable and plunger. The plunger and pump intake piping would also serve to remove air trapped within the collapsible enclosure.

Removal of the enclosures' contents by pumping can utilize commercially-available pumps such as a diaphragm pump and piping connected to the plunger and pump intake piping located in the interior of the enclosure.

BRIEF DESCRIPTION OF THE DRAWINGS

The accompanying drawings, FIG. 1 through 6, which are incorporated herein by reference and constitute part of this specification, exemplify the embodiments of the present invention and in conjunction with written descriptions, serve to illustrate and explain principles of this invention.

DETAILED DESCRIPTION OF THE INVENTION

Embodiments of the invention operate to effectively resolve four problems related to removal of contaminants in detritus and sediment of water bodies. First, the top layer of contaminated sediment and detritus is often very loose and can be easily disturbed and redistributed into the water column when using dredging techniques, heavy equipment or during application of chemicals and binders. The invention is a collapsible enclosure with a high ratio of aerial coverage to interior volume that can capture and isolate the targeted area of contaminants with minimal deployment disturbance to targeted contaminant areas. Second, contaminated detritus and sediment can be located in ecologically sensitive, littoral regions of water bodies that can be adversely impacted by other dredging techniques and apparatus or by the addition of chemicals or clays to bind or treat contaminants. The invention is primarily a light, soft structure that is ecologically sensitive enough to be deployed on top of shellfish beds or emergent plants for a short period of time without causing immediate or long term damage. Third, other removal methods for contaminated detritus and sediment can generate large volumes of contaminated water and suspended sediment and detritus requiring additional special handling, treatment, storage and disposal considerations and higher costs. The invention includes a unique process whereby the soft enclosure layers actual collapse as contaminated water and suspended sediment and detritus are pumped out of the enclosure. This collapsible aspect allows for removal of the interior volume of the enclosure without having to add air or additional water to replace the volume pumped out. And, fourth, contaminants can be located in shallow water, in small water bodies, or on top of significant thicknesses of very soft sediment and detrital layers which are not well suited to the use of larger, heavier or more rigid dredging techniques, or application of chemicals or binders. This collapsible enclosure invention has a high aerial coverage to internal volume ratio, is scalable in size, and can be effectively used in shallow water, on sloped surfaces, in small water bodies such as landscape water features, and on top of thick sequences of very soft sediment while minimizing overall disturbance to non targeted contaminated sediment, detrital layers and surrounding environments.

An additional problem solved by this invention when compared to the use of chemicals or binders to treat or bind contaminants in place is that the collapsible enclosure invention can permanently remove targeted contaminants from water bodies without the use of toxic or harsh chemicals, repeated applications and recurring costs of same over time, or harm to aquatic biota related to the use of chemicals and binders.

The invention and components disclosed herein, as illustrated on FIGS. 1, 2, 3, 4, 5 and 6 comprises a two layer, soft, collapsible enclosure 10 constructed of either flexible polyethylene sheeting, nylon, polyester or similar waterproof or water resistant fabric layers. Polyester and nylon fabrics are preferred both for their workability, flexibility, strength and durability. The collapsible enclosure is constructed by sewing sections of fabric together to form a pyramid shape for rectangular enclosures or a conical shape for circular enclosures. Seams and points of contact are reinforced for added strength and durability. The height of the enclosure 10 is determined in a way that minimizes the volume of water isolated in the enclosure 10 while at the same time maximizing the aerial coverage over the targeted contaminated sediment or detritus area. The enclosure can be any three dimensional shape but either pyramidal or conical are preferred for their ease of construction, uniform collapsibility of the enclosure and symmetrical load distribution.

Support structures 11 provide support and shape to the enclosure 10 and can be constructed of solid or hollow metal or plastic piping or solid rods. Preferably, the supporting structure rods 11 are made of polyvinyl chloride pipe for their strength, lightness, workability, durability and commercial availability. If metal is used, aluminum or stainless steel are preferred. Bracing structures 12 are constructed of the same piping material as the support structures 11 and are used to add strength to the overall supporting structure 11 by connecting each supporting structure 11 with each other near the outside edge of the enclosure 10. Stakes or weights 13 at the end of each supporting structure 11 pole are used to help maintain the position and integrity of the enclosure. A circular weight and support connector 14 is also used at the top of the support structures 11 to help maintain the position and integrity of the enclosure. The circular weight and support connector 14 has an open hole in the center to allow for movement of the suspension cable and pump intake piping 15.

The bracing structure 12 connecting points to the supporting structures 11 also serves as the connecting point to the inner, soft barrier wall 16 of the enclosure 10. The soft barrier wall 16 is where the innermost enclosure layer drops down to form the first contact seal with the detritus and sediment surface 17. This inner enclosure layer and barrier wall is illustrated on FIG. 4. As illustrated in a partial cross section in FIG. 6, the lower, sediment contact edge of the barrier wall 16 is weighted to help maintain contact with sediment and detritus surfaces 14. The lower edge of the interior barrier wall 16 can also be designed to extend vertically slightly beyond the targeted contaminant removal depth. The same lower edge of the barrier wall 16 is also constructed so as to extend further laterally into the center of the enclosed area than the overlying bracing structure 12. In this manner, as water contained within the enclosure is agitated by an up and down motion on the enclosure 10 top and the plunger and pump piping intake structure 18, water flow paths are redirected toward the center base of the enclosure rather than lifting the barrier wall 16 and leaking out of the inner enclosure layer.

The outer layer of the soft enclosure 10 extends over the inner layer and soft barrier wall 16 and beyond the limits of the support structures 11 and stakes or weights 13. The perimeter of the outer layer is also weighted in a manner similar to the inner barrier wall 16 edge. Preferably, weights in the edges of the enclosure 10 fabric are sewed in place and consist of a soft weighted roping, a light chain or sand. The weighted edges of the enclosure 10 should remain flexible and light enough for easy transport, placement, and to maintain the ecological sensitivity of the invention to aquatic biota while at the same time maintaining sufficient contact with the detrital and sediment surface 17 to keep contaminants in the enclosure until they can be removed.

The plunger 18 is constructed of a rigid to semi-rigid plastic or metal with perforations along the exterior edges to allow for water and suspended sediment flow to the pump intake even if the plunger 18 is resting on the detrital or sediment surface 17. If metal is used, aluminum or galvanized steel is preferred for construction of the plunger 18. The plunger is connected to the pump intake piping and suspension cable 15 and top layers of the enclosure 10 by commercially-available brackets. All edges of the plunger are rounded and smooth to limit the potential for tearing or catching of the collapsible enclosure 10 during operation. The suspension cable 15 can be made of either coated stainless steel cable, polypropylene or nylon rope. Polypropylene roping is preferred as it has some stretch and is otherwise resistant to deterioration while in contact with water. The piping 15 connecting the interior pump intake in the plunger 18 to the exterior of the enclosure 10 can be made of either rigid polyvinyl chloride pipe or semi-rigid, high density polyethylene pipe. In either case, the piping must not interfere with the up down motion of the plunger 18 and top of the enclosure 10. The piping 15 can be capped near the floating buoy 19 when not in use and secured against the suspension cable 15 which is attached to the buoy 19.

Figure 1:
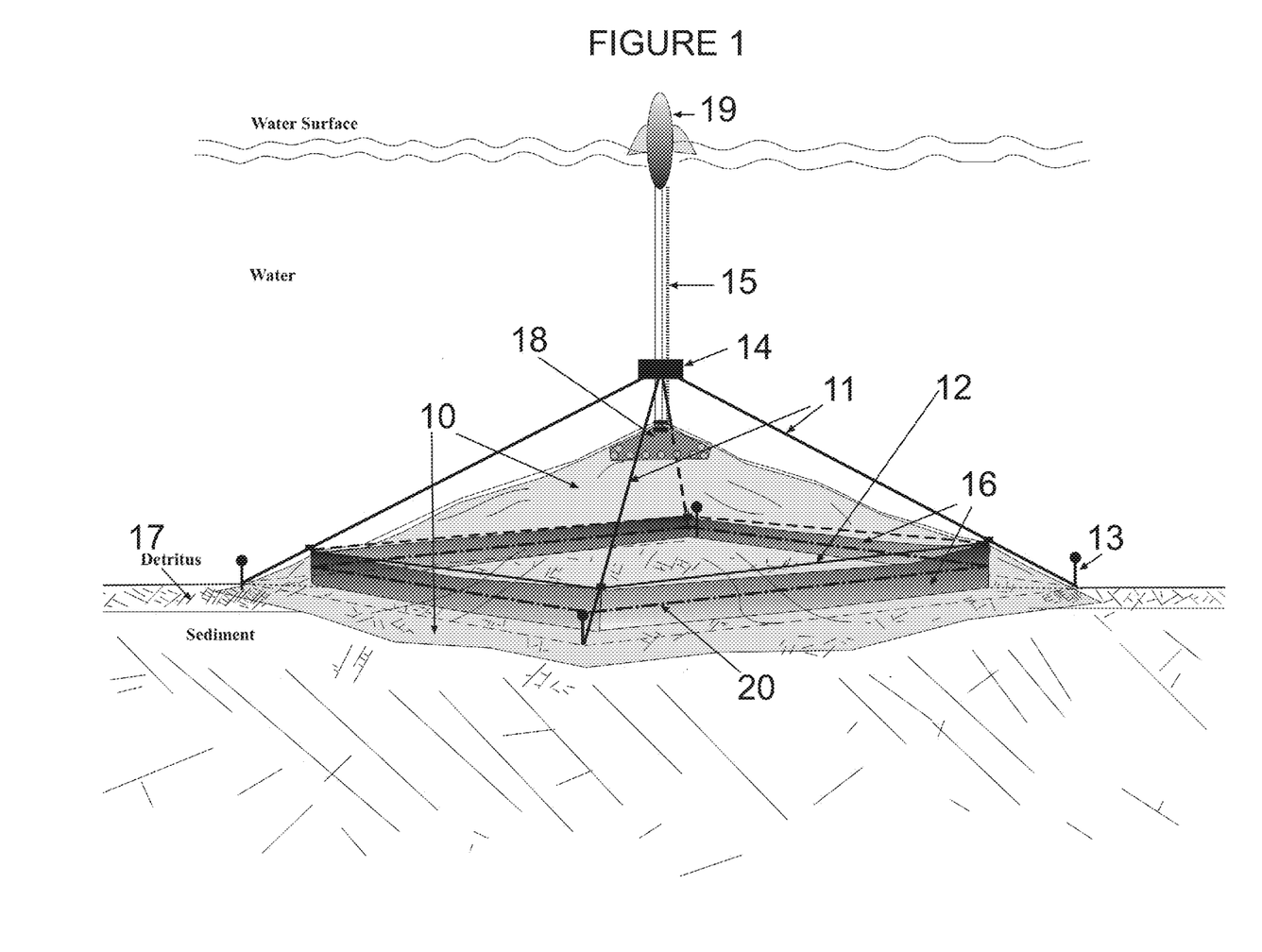
FIG. 1 is a side view and schematic diagram of invention. This figure illustrates a deployed situation for the invention as it gently rests on the detritus and sediment surfaces of a water body. The soft layers of collapsible enclosure are in the fully engaged position.
Figure 2:
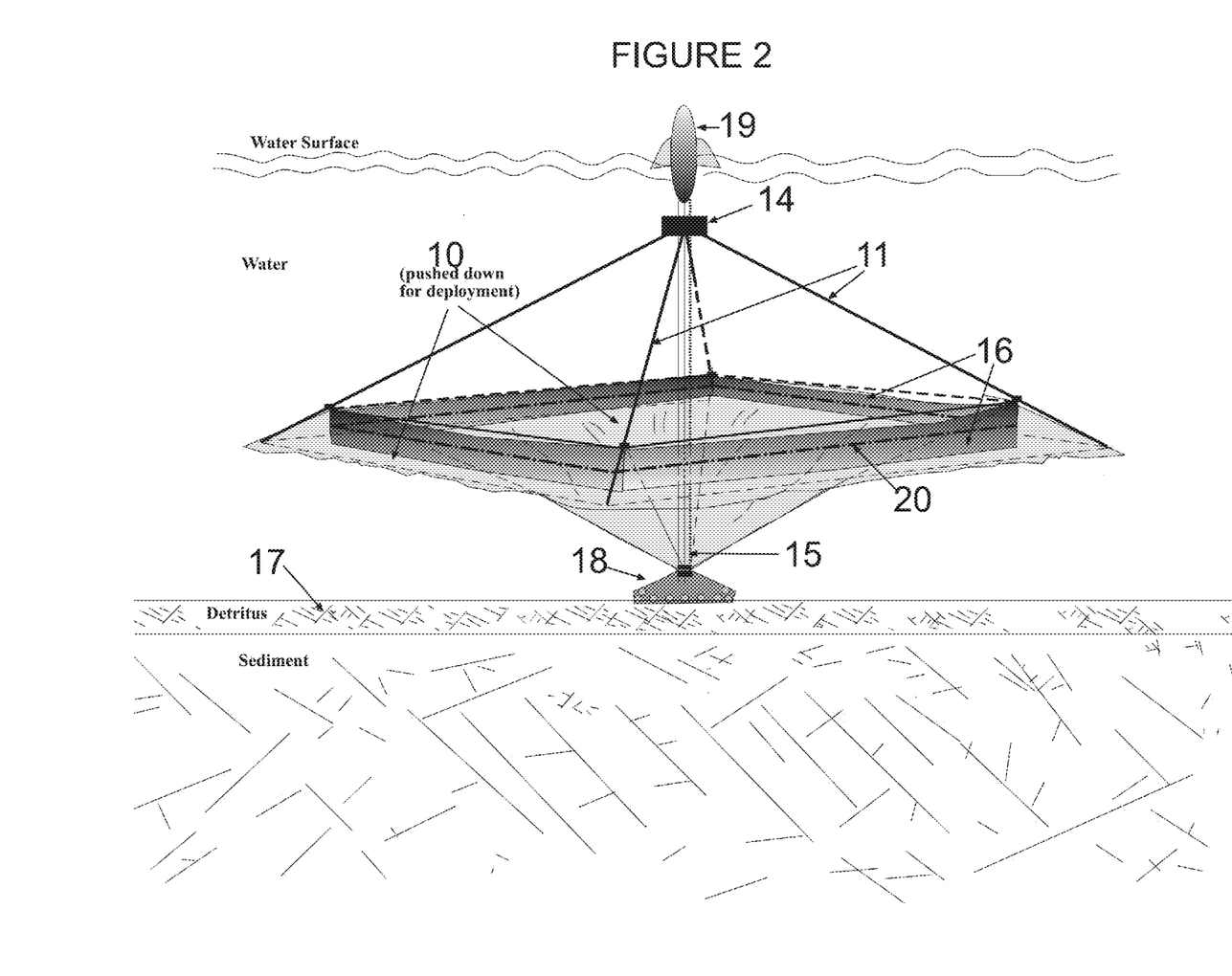
FIG. 2 is a side view and schematic diagram of the invention being deployed. The figure illustrates the general configuration of the invention while it is being lowered or pushed downward to the detrital and sediment surface. The soft layers of the collapsible enclosure are down or in the full pre-deployment position. Once the plunger and pump piping intake section contact the sediment surface, the remaining portions of the invention will continue to drop and eventually will capture and contain the targeted detrital and sediment layers beneath the extent of the collapsible enclosure as represented in FIG. 1.

The invention is light enough to be deployed and used without the need for heavy equipment, barges or in some instances even boats. Once constructed, the supporting 11 and bracing structures 12 form a self standing structure to which the enclosure 10 is attached just prior to placement in the water body. Once constructed, multiple collapsible enclosure units can be stacked on top Of each other for ease of transport and deployment. As illustrated in FIG. 2, during deployment through the water column, the invention is lowered into place by pushing downward on the plunger 18 and pump piping 15. In this way, the plunger 18 would be the first component of the invention to contact the targeted contaminant area. Once contact is made, the remaining portions of the invention would continue to fall until they come to rest on, and capture the targeted contaminated sediment and detritus layer. If warranted, additional support to the invention can be provided by adding stakes or weights 13 at the ends of the support structures 11. For the preferred embodiment of this invention, a minimum of four support structure 11 poles or rods are used to form the exterior skeleton of the enclosure 10. The placement of the invention on the targeted contaminant area can be confirmed by those skilled or trained in the art and science including those licensed or trained to work underwater. Once sufficient contact is made with the contaminated sediment and detritus, the invention can be used either to dissociate solid contaminants into a soluble form by microbial and geochemical processes or contaminants can be removed by their physical disturbance and suspension within the enclosure. Followed by removal of the collapsible enclosure's contents using a temporary piping connected to the enclosure's piping and a pump on a boat on or land.

Depending upon the contaminant types present, the isolated interior portion of the collapsible enclosure 10 can be used to alter or enhance microbial and geochemical dissociation of contaminants from solid to soluble form. Those skilled in the art and science of contaminant remediation would be able to alter and monitor dissolved oxygen, temperature, oxidation reduction potential, pH, carbon substrate, and nutrient content of water within the enclosure to facilitate removal of contaminants in sediment and detritus by dissociation and degradation. The invention is equipped with perforated interior piping 20 to facilitate addition or removal of treated water combined with the use of the pump intake piping 18. Treatment to dissociate contaminants could continue until the contaminant concentration in water decreases over time, as confirmed by field and laboratory testing and analysis.

Contaminated sediments and detritus can also be removed by physically agitating the top of the enclosure 10 and plunger 18 with an up and down motion either created by hand by raising and lowering the suspension cable and pump piping 15 or by wave action on the buoy 19. Water could also be injected into the perforated interior piping 20 while being removed at the plunger and pump piping intake 18 to physically disturb water, sediment and detritus within the collapsible enclosure 10. The perforated interior piping 20 can be connected to the water surface either by extending piping to the main buoy 19 or by extending it to a separate and dedicated buoy at the water surface (not shown but otherwise identical to the primary buoy 19). Removal of the contaminated sediment, detritus and water mixture would continue until the turbidity of extracted water decreased sufficiently as measured by field or laboratory testing. After fully collapsing the enclosure 10 during water extraction, additional water, sediment and detritus mixture extraction could commence once sediment pore water and water exterior to the enclosure 10 was allowed to slowly reenter the enclosure by raising the top of the enclosure 10 and plunger 18.

Once contaminants are sufficiently removed the invention can either be removed or the soft, collapsible enclosure 10 portion of the invention can be detached from supporting structures 11, bracing 12, and the plunger and pump piping intake 18 and left in place as a long term barrier to aquatic plant growth where control or removal of nuisance, noxious or invasive plants are desired. Additionally, the enclosure can be left in place to control or remove invasive biotic species such as zebra mussels.

Figure 3:
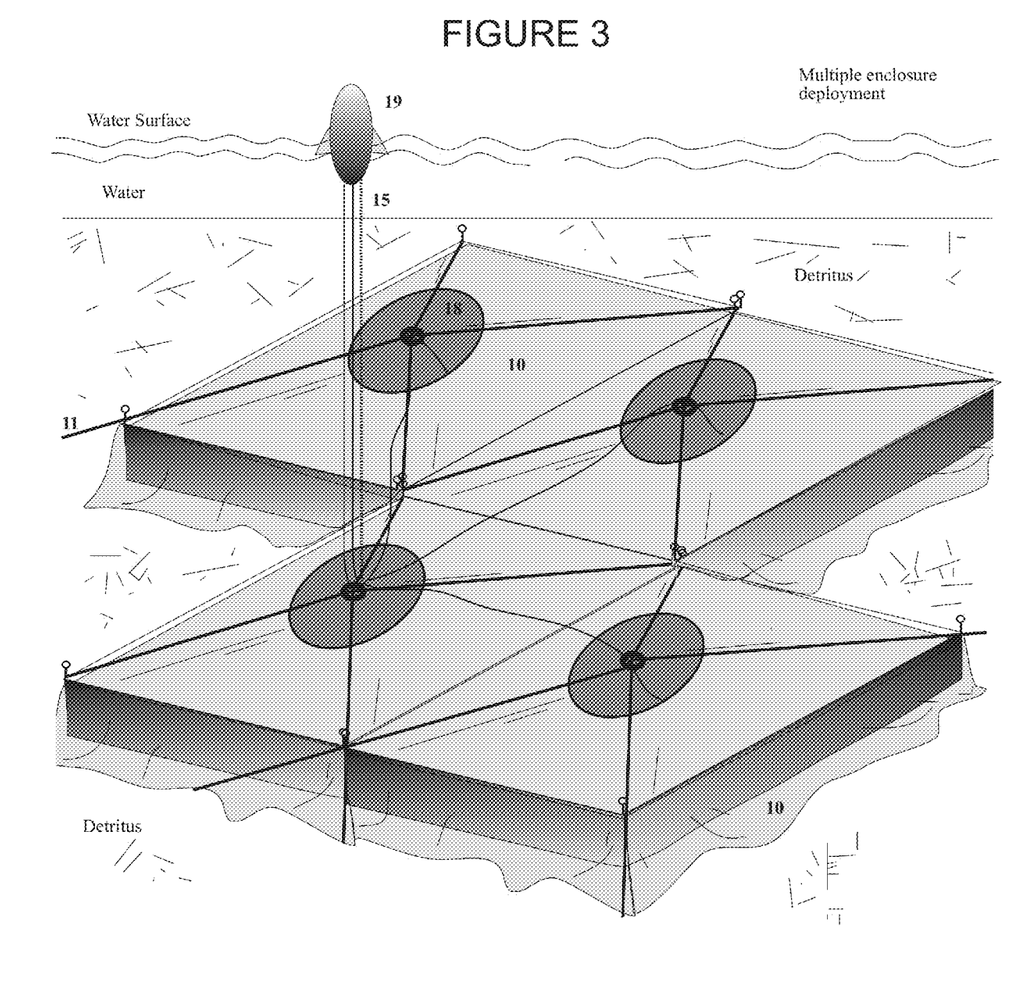
FIG. 3 is an illustrative schematic of several collapsible enclosures subject to this invention being deployed but linked together on the detrital/sediment surfaces in a body of water. The individual invention collapsible enclosures are scalable, they can be linked together to simultaneously provide larger areas of coverage for removal of contaminants. For convenience and to limit the number of overall buoys, discharge piping from each collapsible enclosure can be piped through a single buoy access point.
Figure 4:
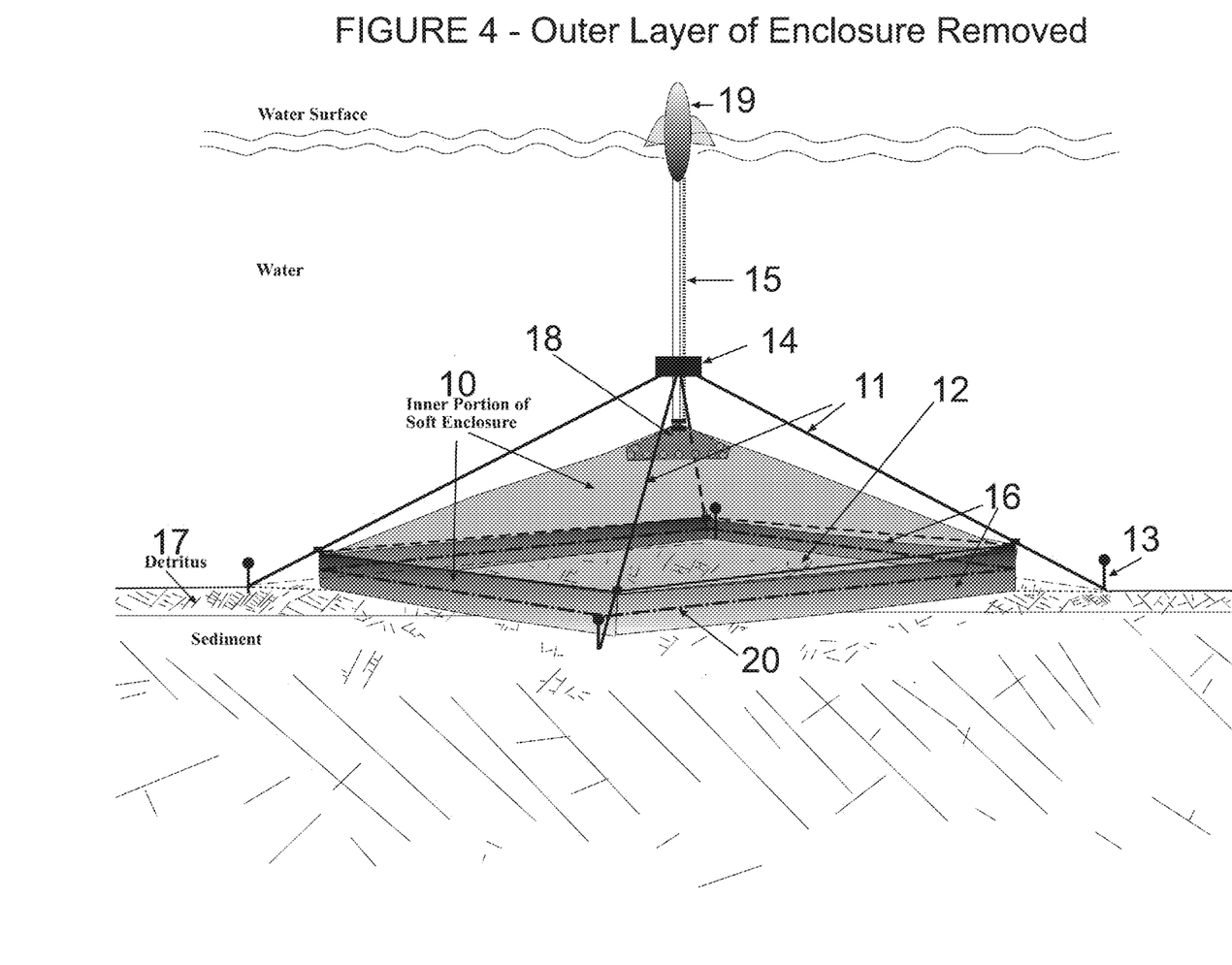
FIG. 4 depicts the invention with the outer or top layer of soft enclosure layer or fabric removed. The inner collapsible enclosure layer serves to form an initial barrier wall to help retain detritus, sediment or contaminants during operation of the invention. The lower edge of this layer, in contact with the detritus and sediment layers is weighted around the internal circumference or opening of this enclosure layer. The weighted edge also has sufficient additional material or slack to extend below the deployed elevation of the main structure.
Figure 5:
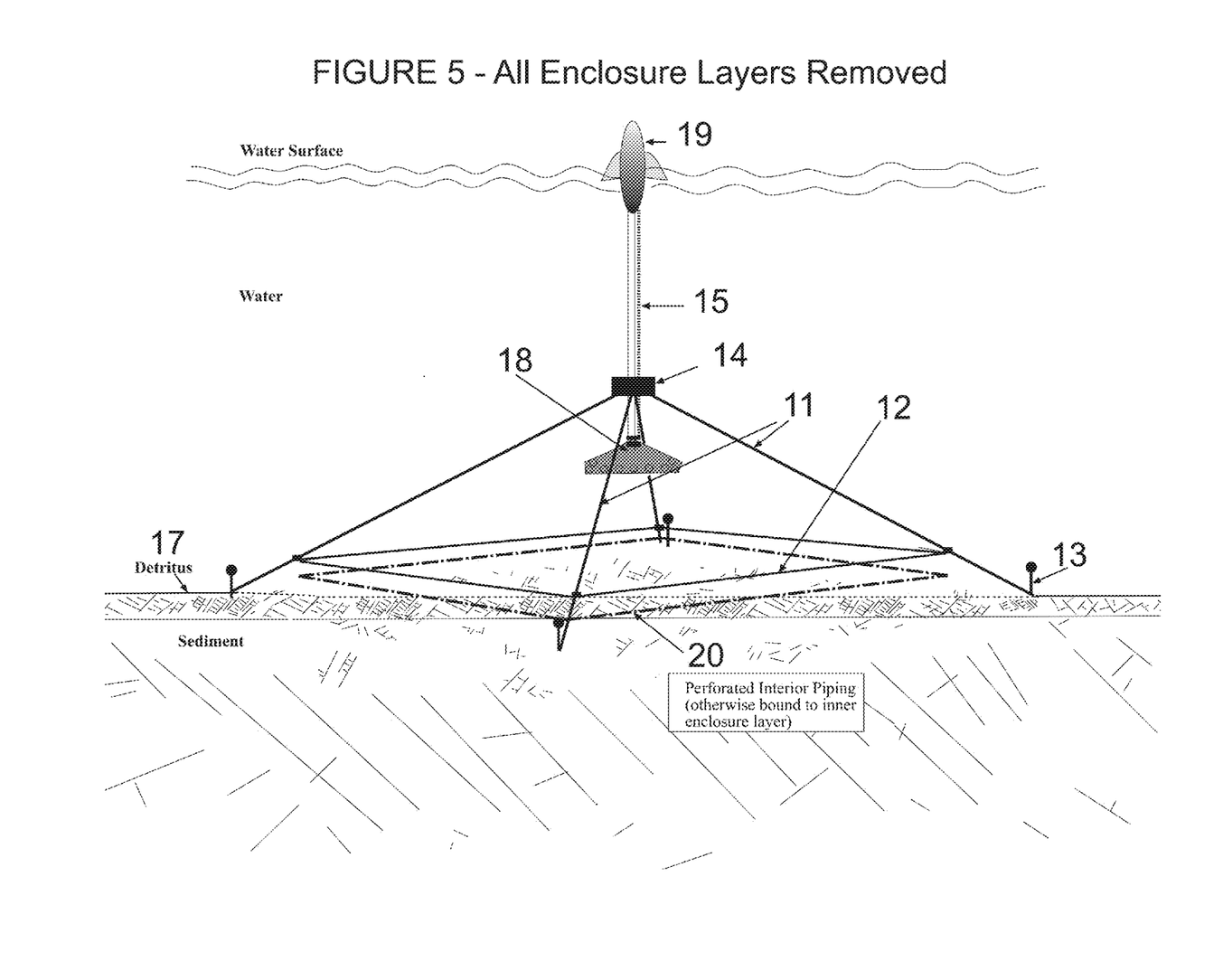
FIG. 5 depicts the invention deployed but for illustrative purposes without the soft, waterproof enclosure layers. The structure is kept in place by both a weighted center piece, the Weight and Support Connector, and by stakes or weights at the sediment contact end of each Support Structure. This figure also depicts an internal, circumferential perforated pipe that can be used to add fluid, air, or treatment fluids to the interior of the enclosure. The perforated piping also aids in keeping the interior of the soft enclosure fully open or exposed to the targeted detritus and sediment layers during operation of the invention.
Figure 6:
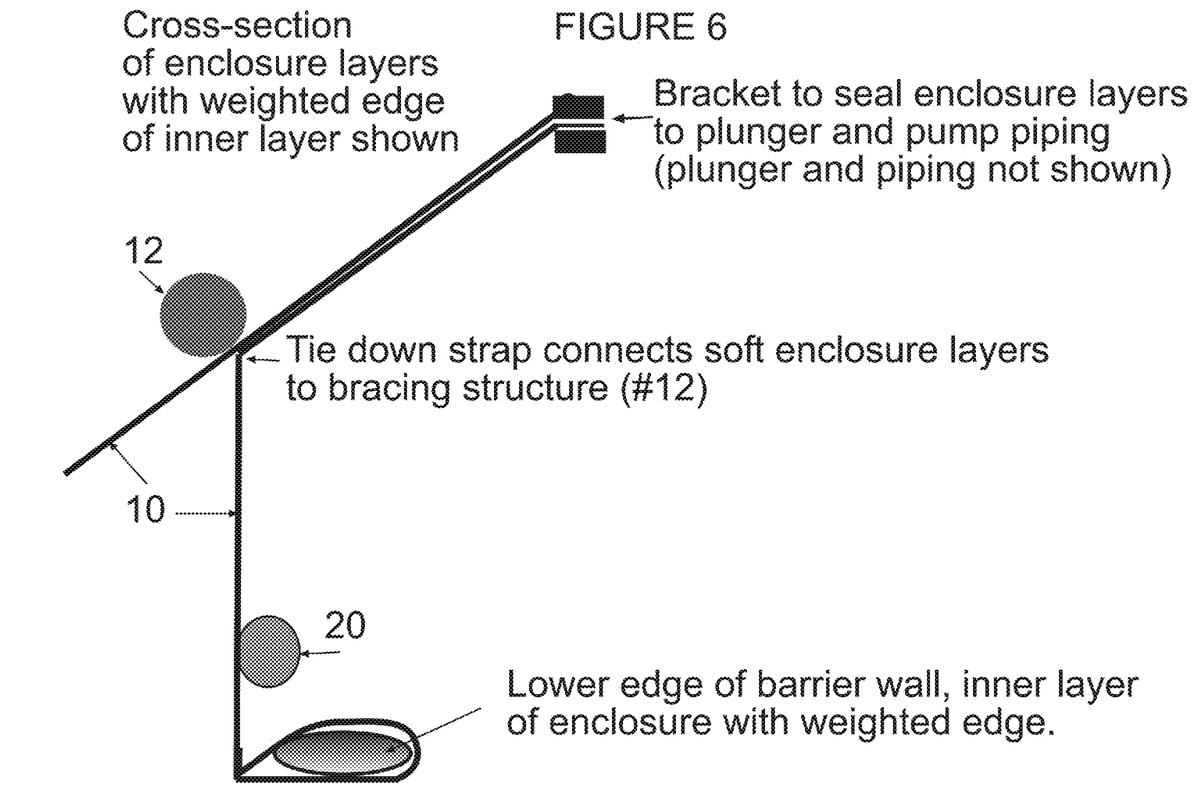
FIG. 6 depicts a cross-section of the inner, soft enclosure layer. The perforated pipe and weighted, lower, edge of this enclosure layer is illustrated.

As illustrated in FIG. 3, another embodiment of this invention would be to use more than one collapsible enclosure 10 and related structure at a time. The enclosures can be used side by side to effectively capture larger areas of targeted contaminants while minimizing potential disturbance to contaminated sediments outside the deployed invention area. As contaminated sediments and detritus are removed, individual collapsible enclosures can be redeployed onto remaining areas of contaminated detritus and sediment.

Another embodiment of the invention is its use to control or eliminate nuisance, noxious or invasive aquatic flora and fauna; also referred to as contaminants relative to this invention. Once these areas are targeted, the invention can be used to control light penetration or to create an isolated water volume above these targeted flora and fauna. The isolated water volume could then be used to apply substances approved for use in the control or removal of these flora and fauna or to alter the geochemistry of the water such as it's dissolved oxygen, pH or carbon dioxide content such that the flora and fauna within the enclosure 10 could no longer thrive.

While the narrative and illustrations included with this application serve to describe the preferred form and function of various embodiments and components of the invention, it will nevertheless be understood by others that various other modifications may be made without departing from the basic principles, intent and scope of the invention. Accordingly, other modifications and embodiments are within the invention scope for the following claims.

What I claim is:

1. A collapsible aquatic enclosure apparatus for removal of contaminated aquatic sediments and detritus, or for control of targeted aquatic fauna and flora, comprising:
   a collapsible, flexible enclosure constructed of an inner layer of waterproof fabric or water resistant fabric defining an inner portion of the enclosure and an outer layer of waterproof fabric or water resistant fabric defining the exterior portion of the enclosure, and a bottom open to the interior portion, the enclosure and exterior supporting structures together form an isolated water volume when deployed above an aquatic area of contaminants or targeted flora and fauna;
   an internal plunger and pipe intake structure attached to the top interior of the enclosure for agitating and removing sediment and detritus within the enclosure;
   weights attached to the bottom edges of the inner and the outer layers of the enclosure to keep the open bottom portion of the enclosure in contact with sediment and detritus surfaces and to keep water and contaminants contained within the isolated water volume of the enclosure until they can be removed through the pipe intake structure;
   a perforated pipe running the internal perimeter of the inner layer for adding or extracting fluid to/from the collapsible enclosure;
   an external support and bracing structure to add shape and control to the collapsible enclosure with locations on the bracing structure to attach to the enclosure; and
   a weighted ring at the top center of the external support and bracing structure to bind and hold the support and bracing structure in place, the ring having an opening sufficiently large enough to allow the pipe intake structure and a suspension cable to extend freely through same to the enclosure and upwards to the water surface and/or a buoy.

2. The enclosure apparatus of claim 1 wherein the collapsible enclosure has a pyramidal or conical shape where the apex is the center of the collapsible enclosure and the exterior portion of the collapsible enclosure spread outward to maximize aerial coverage and containment of contaminated sediments and detritus or targeted flora and fauna.

3. The enclosure of claim 1 wherein the inner layer and the outer layer of the waterproof fabric or water resistant fabric have seams and contact points that are reinforced.

4. The enclosure apparatus of claim 1, further comprising a buoy at the water surface connected to the collapsible enclosure by a suspension cable, the plunger and the pipe intake structure.

5. The enclosure apparatus of claim, 4,wherein the suspension cable can be lowered and raised to activate the plunger.

6. The enclosure apparatus of claim 4, wherein the pipe intake structure can be raised and lowered to activate the plunger.

7. The enclosure apparatus of claim 1, wherein the waterproof or water resistant, fabric is polyester or nylon.

8. The enclosure apparatus of claim 1, wherein a plurality of same enclosure apparatuses are linked together to form a greater aerial coverage over targeted contaminants or fauna and flora than the aerial coverage of a single enclosure apparatus.

9. The enclosure apparatus of claim 1 wherein the collapsible enclosure is detachable from the external support and bracing structure.

10. The enclosure apparatus of claim 1 wherein the apparatus is configured to be stacked onto at least one other enclosure apparatus.

11. A method for isolating and removing contaminants, detritus and sediments in a target area of a water body, comprising:
   deploying a collapsible enclosure apparatus on top of the target area in the water body to contain contaminants, detritus and sediments within the interior of the enclosure; wherein the collapsible enclosure apparatus comprises:
      a collapsible, flexible enclosure constructed of an inner layer of waterproof fabric or water resistant fabric defining an inner portion of the enclosure and an outer layer of waterproof fabric or water resistant fabric defining the exterior portion of the enclosure, and a bottom open to the interior portion, the enclosure and exterior supporting structures together form an isolated water volume when deployed above the target area;
      an internal plunger and pipe intake structure attached to the top interior of the enclosure for agitating and removing contaminants, sediments and detritus within the enclosure;
      weights attached to the bottom edges of the inner and the outer layers of the enclosure to keep the open bottom portion of the enclosure in contact with sediment and detritus surfaces and to keep water and contaminants contained within the isolated water volume of the enclosure until they can be removed through the pipe intake structure;
      a perforated pipe running the internal perimeter of the inner layer for adding or extracting fluid to/from the collapsible enclosure;
      an external support and bracing structure to add shape and control to the collapsible enclosure with locations on the bracing structure to attach to the enclosure; and
      a weighted ring at the top center of the external support and bracing structure to bind and hold the external support and bracing structure in place, the ring having an opening sufficiently large enough to allow the pipe intake structure and a suspension cable to extend freely through same to the enclosure and upwards to the water surface and/or a buoy;
   dissociating the contaminants, sediments and detritus by physically disturbing or chemically altering the water, sediments and detritus within the enclosure; and
   pumping the contaminants, detritus and sediments out of the enclosure through the pipe intake structure and allowing the enclosure to collapse, to thereby isolate and remove the contaminants, detritus and the sediments in the target area of the water body.

12. The method of claim 11, wherein the collapsible enclosure is detached from the external support and bracing structure and left at the target area.

13. The method of claim 11, wherein a plurality of enclosures linked together are deployed onto the target area.

14. A method for controlling invasive aquatic flora and fauna in a target area of a water body, comprising:
- deploying a collapsible enclosure apparatus on top of the target area in the water body to contain the flora and fauna within the interior of the enclosure; wherein the collapsible enclosure apparatus comprises:
  - a collapsible, flexible enclosure constructed of an inner layer of waterproof fabric or water resistant fabric defining an inner portion of the enclosure and an outer layer of waterproof fabric or water resistant fabric defining the exterior portion of the enclosure, and a bottom open to the interior portion, the enclosure and exterior supporting structures together form an isolated water volume when deployed above the targeted flora and fauna;
  - an internal plunger and pipe intake structure attached to the top interior of the enclosure for agitating and removing contaminants, detritus or sediments with flora and fauna residues in the enclosure;
  - weights attached to the bottom edges of the inner and the outer layers of the enclosure to keep the open bottom portion of the enclosure in contact with the flora and fauna and contained within the isolated water volume of the enclosure until contaminants, detritus, sediment and targeted flora and fauna residues can be removed through the pipe intake structure;
  - a perforated pipe running the internal perimeter of the inner layer for adding or extracting water to/from the collapsible enclosure;
  - an external support and bracing structure to add shape and control to the collapsible enclosure with locations on bracing structure to attach to the enclosure; and
  - a weighted ring at the top center of the external support and bracing structure to bind and hold the external support and bracing structure in place, the ring having an opening sufficiently large enough to allow the pipe intake structure and a suspension cable to extend freely through same to the enclosure and upwards to the water surface and/or a buoy;
- controlling the targeted flora and fauna within the enclosure;
- pumping the contaminants, detritus, sediments and targeted flora and fauna residues out of the enclosure through the pipe intake structure and allowing the enclosure to collapse; and
- optionally treating the water within the enclosure to control the flora or fauna in the target area.

* * * * *